United States Patent Office 3,392,507
Patented July 16, 1968

3,392,507
PREPARATION OF A SUPPORT FOR USE IN
GAS CHROMATOGRAPHY
Daniel Marvin Ottenstein, Somerville, N.J., assignor to
Johns-Manville Corporation, New York, N.Y., a corporation of New York
No Drawing. Filed Dec. 2, 1964, Ser. No. 415,452
11 Claims. (Cl. 55—67)

ABSTRACT OF THE DISCLOSURE

Supports for gas chromatography. A support for gas chromatography is formed by flux calcining crushed diatomite firebrick, which has been previously calcined. Fluxes include $Na_2O$, $K_2O$, and $NaF$. The final product has a low degree of adsorption, relatively high column efficiency, and low friability. Surface area is greatly reduced in flux calcining.

This invention relates to the preparation of supports for use in gas chromatography. More particularly, this invention relates to new chromatographic supports having low adsorptive effects and good column efficiency comprising a flux-calcined crushed diatomaceous firebrick material.

In choosing a material as a chromatographic support, two factors, structure and surface characteristics, must be considered. Structure is important because it contributes to the efficiency of the material as a support, whereas the surface characteristics govern the degree to which the support enters into the separation. Regarding the first factor, the surface area should be reasonably high so that the liquid phase may spread out as a thin film, however, high surface area per se will not necessarily provide an efficient column. Consequently, the structure should have the ability to hold the liquid phase in such a manner that the efficiency is high. As to the second factor, many of the limitations of gas chromatography are due to the adsorptive effects of the support used and, ideally, the surface should be chemically inert and not enter into the separation. The material should also have good handling characteristics, that is, it must be strong enough to resist breakdown in handling and be capable of being packed into a uniform bed in a column.

While other materials, such as glass beads, Teflon, and salt have been used as supports with varying degrees of success, supports made from diatomite or diatomaceous silica have been the most widely used since the beginning of gas chromatography. The original work done in gas chromatography was with Celite 545, a diatomite material; and later Sterchmol diatomite firebrick and Sil-O-Cel C-22 diatomite firebrick made good supports.

The existing diatomite supports may be classified as two types: (1) materials made from diatomite brick which are essentially calcined diatomite, a pink material, and (2) materials made from diatomite filter aid which are flux-calcined aggregates, a white material.

The white aggregate material is prepared by mixing diatomite with a small amount of flux, e.g., sodium carbonate, and calcining it at temperatures above 900° C. During calcination a number of changes take place. The fluxing agent causes incipient fusion of the finer particles forming coarser aggregates. A portion of the microamorphous silica is converted to crystalline form, cristobalite. The original light-gray diatomite becomes white because of the flux, which is believed to convert the iron originally present as an oxide to a colorless complex sodium iron silicate.

The brick, or pink material, consists of diatomite that has been crushed, blended and pressed into brick, then calcined or burned above 900° C. to permit its use as a high-temperature insulation. During calcination the diatomite particles fuse and again convert a portion of the silica to cristobalite. At the same time the mineral impurities form complex oxides or silicates. The oxide of iron is thought to impart the characteristic pink color.

The pink material is generally a hard, consolidated material with considerably fine structure. An example of this type of support is Chromosorb P, which has a surface area of about 4.0 m.$^2$/g. or 1.88 m.$^2$/cc. The white material is generally a light, friable material with considerably less fine structure than the pink material. The white material has a surface area of about 1.0 m.$^2$/g. or 0.29 m.$^2$/cc.

The surfaces of both the pink and white supports are very similar. The principal difference lies in the density of the two and the resulting total surface area that is present in a chromatographic column. The pink material, having a greater surface area per unit volume, shows greater adsorption than the white material. For this reason, the white material is generally favored as the support in columns used to separate polar compounds. At the same time the white material has an inherent column efficiency less than that of the pink material. The white material is also very friable as contrasted to the pink material and shows considerable breakdown in handling. Breakdown causes fines and these cause increased column back pressure, which results in a poorer column.

One of the principal difficulties with diatomite supports is that the surfaces are covered with silanol groups (—Si—OH) and accordingly, this group can hydrogen bond with compounds such as alcohols, ketones and esters. This interaction results in adsorption of a portion of the sample on the support and results in a chromatographic peak that is asymmetrical, which is more commonly referred to as peak tailing.

Considerable work has been done to modify the existing supports to reduce this tailing effect. These methods can be generally grouped into four categories: (1) use of a polar liquid phase or use of a small amount of liquid phase (tail reducer) along with a non-polar liquid phase, (2) modification of the support surface by reacting the surface silanol group generally with silanes, (3) removal from the surface of inorganic impurities in the diatomite by washing with acid and/or base, and (4) coating the support surface with a solid material.

Additional attempts have also been made to modify the pink or brick materials to reduce adsorptive effects by calcining them at elevated temperatures. The Sil-O-Cel C-22 brick has been calcined at 1350° C. (2460° F.) and a support obtained with reduced surface activity. Calcination of Sterchmol brick at 2012° F. and 2100° F. reduces the surface area and produces a more inert support. These techniques have had the disadvantages of extended processing time and usually high operating temperature conditions which are impracticable in most cases and consequently economically undesirable.

There remains, however, a continuing demand for more effective column supports having the highest possible column efficiency.

It is therefore a principal object of this invention to provide a new chromatographic support that exhibits low adsorptive effects but has good column efficiency and good handling properties.

It is a further object of this invention to provide a gas chromatography support that exhibits good column efficiency and substantial inertness of the support surface.

It is another object of this invention to provide a new technique for manufacturing chromatographic supports, and particularly ones characterized by the properties set out in the above objects.

Further objects and applicability of the invention will become more apparent from the following detailed description.

It has been discovered that the foregoing objects may be satisfied and a new, more efficient support produced by means of double calcination of diatomite, whereby firebrick is prepared in a standard manner using calcination, crushed (such as 30/60 mesh), and is subjected to a second calcination and one involving a flux. The resulting support is superior to existing supports in three respects: it is similar in its low degree of adsorption to the white supports, while comparing favorably with the pink support in its relatively high column efficiency, and it shows a low degree of friability and does not readily break down with normal handling.

By the use of a flux agent and controlling such factors as concentration of flux, between about 1 and 9% by weight of the diatomite, and duration and temperature of calcination, it is possible to modify the surface of diatomite so that supports can be prepared with various surface areas and varying degrees of adsorption.

The support is prepared by flux calcining diatomite firebrick. The Sil-O-Cel C-22 is illustrative of such brick and is preferred as the base material because it can be readily ground and size-graded to the approximate particle size of the desired product. By working with the starting material divided into small particles (10/100 mesh), one insures the adequate distribution of flux throughout the particle insuring even calcination. Calcined diatomite in other forms could also be subsequently flux-calcined to reduce its surface area.

Effective agents in reducing surface area of the previously calcined diatomite are potassium carbonate, potassium hydroxide, sodium carbonate, sodium hydroxide, sodium fluoride and potassium fluoride. Less effective agents are sodium chloride, sodium borate and sodium silicate. In the case of the sodium and potassium carbonates and hydroxides, it is thought that the effective flux is actually sodium oxide and potassium oxide. It is assumed that both the hydroxides and the carbonates decompose during calcination and give the oxides.

A more complete understanding of the invention may be obtained by reference to the following examples of operations within the scope of this invention. In these examples all parts and percentages are by weight unless otherwise indicated.

The calcination was carried out in an electrically heated globar muffle furnace with a maximum temperature limitation of 2500° F. Fused silica trays were used to hold the material to be calcined.

The feed was prepared by coating the crushed diatomite firebrick with flux, by dissolving the flux in water and pouring the solution on the firebrick and then tumbling the firebrick for 30 minutes to evenly distribute the solution and flux on the C-22 firebrick. For 100 parts of C-22 firebrick, 40 parts of water used. The amount of flux used was calculated on the dry weight of the C-22 firebrick.

The furnace was preheated to temperature and then the sample was inserted. After the prescribed period of time, the sample was removed from the furnace while the furnace was still at temperature. The calcination was carried out for 6 hours at 2100° F., except in the case of sodium fluoride which was calcined for 1 hour. Table 1, below, shows that starting with the same material varying degrees of calcination are obtained with different flux agents.

TABLE 1.—COMPARISON OF THE EFFECTIVENESS OF VARIOUS FLUXES IN REDUCING SURFACE AREA OF DIATOMITE. STARTING MATERIAL SIL-O-CEL C-22 DIATOMITE FIREBRICK—4.0 m.²/g. SURFACE AREA.

| Flux | Concentration | Surface Area |
|---|---|---|
| NaCl | 5.0 | 1.09 |
| $Na_2B_4O_7$ | 5.0 | 0.30 |
| KF | 5.0 | 0.98 |
| NaOH | ¹ 6.5 | 0.13 |
| KOH | ² 6.0 | 0.19 |
| $Na_2CO_3$ | ³ 8.3 | 0.19 |
| $K_2CO_3$ | ⁴ 7.3 | 0.27 |
| $NaSiO_3$ | 5.0 | 1.53 |
| NaF | 4.0 | 0.21 |

¹ 5.0 percent $Na_2O$.
² 5.0 percent $K_2O$.
³ 5.0 percent $Na_2O$.
⁴ 5.0 percent $K_2O$.

For a given flux, factors such as concentration of flux, temperature and duration of calcination are important in controlling the degree of calcination.

The effect on surface area of varying the concentration of flux is shown in Table 2. With increasing concentration of flux, the surface area is reduced.

The effect on surface area of varying time of calcination is shown in Table 3. With increasing time, the surface area is reduced.

The effect on surface area of increasing temperature of calcination is shown in Table 4. With increasing temperature, the surface area is reduced.

TABLE 2.—EFFECT OF INCREASING FLUX CONCENTRATION ON THE SURFACE AREA OF C-22 FIREBRICK WITH CALCINATION. TIME 1.0 HOUR AT 2000° F. FLUX $Na_2O$

| Concentration percent: | Surface area of C-22, m.²/g. |
|---|---|
| 1.0 | 2.24 |
| 2.0 | 1.35 |
| 3.0 | 0.73 |

TABLE 3.—EFFECT OF INCREASING TIME OF CALCINATION ON THE SURFACE AREA OF C-22 FIREBRICK TEMPERATURE 1900° F. FLUX 5.6 PERCENT $K_2O$

| Time, hours | Surface area, m.²/g. |
|---|---|
| 24 | 0.6 |
| 48 | 0.4 |
| 72 | 0.31 |
| 96 | 0.23 |

TABLE 4.—EFFECT OF INCREASING TEMPERATURE OF CALCINATION ON THE SURFACE AREA OF C-22 FIREBRICK. TIME, 1.0 HOUR. FLUX, 2.0 PERCENT $Na_2O$

| Temperature, ° F.: | Surface area |
|---|---|
| 1800 | 1.96 |
| 1900 | 1.84 |
| 2000 | 1.35 |
| 2100 | 0.89 |
| 2200 | 0.68 |

Calcination was also effected by means of a small rotary kiln, electrically heated with a maximum temperature of 2000° F. The rotary kiln was operated with both continuous feeding and with the feed rotated for a finite time in the kiln with both ends of the kiln closed.

When samples were run at the same temperature as in the muffle furnace and comparable material was obtained in 1 hour in the muffle and 30 minutes residence in the rotary kiln, however, the most satisfactory arrangement found has the calcination in open trays in the muffle furnace for periods of 6 hours.

Very desirable products were obtained with $K_2O$ as flux. It appears that KOH and $K_2CO_3$ can be used interchangeably provided that equivalent concentrations of $K_2O$ are used. The products resulting from the two agents appear to be very similar, although the KOH might give a slightly more inert product. See Table 5.

Suitable and equivalent products were obtained using 4, 6 and 8 percent KOH. As the concentration of flux was increased, the temperature had to be dropped correspondingly. For each concentration of flux, a small range of temperatures were found in which equivalent product was obtained. This range as well as the entire temperature range studied is listed below:

| Percent KOH | Temp. Range, °F. | Total Temp. Range, °F. |
|---|---|---|
| 4 | 2,400 | 2,200–2,400 |
| 6 | 2,100–2,175 | 2,000–2,200 |
| 8 | 1,950–2,000 | 1,800–2,100 |

At 25 F. degrees above the maximum suitable temperature, the products became extremely glassy and were virtually glass beads. At somewhat higher temperature, the bed fuses into a solid mass. At temperatures below the minimum not enough melting has occurred and the surface area is too high.

A study was carried out at 1900° F. with samples run 24, 48, 72 and 96 hours. The samples were found to decrease progressively in surface area and only the 96-hour sample was regarded as being good. It appeared to be inert and also showed higher column efficiency than is normally found with samples of that degree of inertness. Methanol and acetone were separated at 50° C. using 2.5 percent squalane column. The results of this study are set forth in Table 5.

A systematic study was made in the globar muffle furnace on the effect of temperature on concentration of sodium fluoride. The concentration of flux that could be applied was limited by the solubility of sodium fluoride in water, and the study was carried out using 2, 3 and 4 percent flux. The temperature range studied was from 1800° to 2100° F., and a suitable product was obtained with 4 percent flux at 2100° F. run for 1 hour. Even lower surface area could be obtained with longer calcination time. The runs are summarized in Table 6.

TABLE 5.—POTASSIUM OXIDE FLUX ($K_2O$)

[Summary of runs made using $K_2O$ as the flux; Flux Form A—KOH, B—$K_2CO_3$]

| Form | Flux Percent | Conc. A–B $K_2O$ | Temp., °F. | Time, hr. | Surface Area, m.$^2$/9 | MeOH Peak Height, 50° C. | Percent Separation |
|---|---|---|---|---|---|---|---|
| A | 4.0 | 3.4 | 2,200 | 7.5 | 0.35 | 38 | 60 |
| A | 4.0 | 3.4 | 2,300 | 6.0 | 0.24 | 50 | 86 |
| A | 4.0 | 3.4 | 2,400 | 7.5 | | | |
| A | 6.0 | 5.1 | 2,000 | 6.0 | 0.35 | 37 | 60 |
| A | 6.0 | 5.1 | 2,050 | 6.0 | 0.42 | 46.5 | 67 |
| A | 6.0 | 5.1 | 2,075 | 6.0 | 0.16 | 34.5 | 70 |
| A | 6.0 | 5.1 | 2,100 | 6.0 | 0.19 | 70.5 | 89 |
| A | 6.0 | 5.1 | 2,150 | 6.0 | 0.14 | 49.5 | 82 |
| A | 6.0 | 5.1 | 2,175 | 6.0 | 0.16 | 64.5 | 88 |
| A | 6.0 | 5.1 | 2,200 | 6.0 | | 70.0 | 0.0 |
| A | 8.0 | 6.9 | 1,800 | 6.0 | 0.35 | 27.5 | 15.0 |
| A | 8.0 | 6.9 | 1,950 | 6.0 | 0.16 | 56.0 | 86 |
| A | 8.0 | 6.9 | 1,875 | 6.0 | 0.16 | 48 | 80 |
| A | 8.0 | 6.9 | 2,000 | 6.0 | V.L. | 70 | 86 |
| A | 8.0 | 6.9 | 2,025 | 6.0 | 0.22 | 47.5 | 65 |
| A | 8.0 | 6.9 | 2,050 | 6.0 | V.L. | 53 | 0.0 |
| A | 8.0 | 6.9 | 2,100 | 6.0 | 0 | | 0.0 |
| B | 6.0 | 4.2 | 2,100 | 6.0 | | 10 | 20 |
| B | 8.0 | 5.6 | 2,100 | 6.0 | | 80 | 80 |
| B | 8.0 | 5.6 | 1,900 | 24.0 | 0.6 | 14.0 | 29 |
| B | 8.0 | 5.6 | 1,900 | 48.0 | 0.4 | 50 | 60 |
| B | 8.0 | 5.6 | 1,900 | 72.0 | 0.31 | 23.5 | 57 |
| B | 8.0 | 5.6 | 1,900 | 96.0 | 0.23 | 67.5 | 84 |
| B | 8.0 | 5.6 | 2,100 | 12 | | 35 | 80 |
| B | 8.0 | 5.6 | 2,100 | 18 | | 33 | 65 |
| B | 8.0. | 5.6 | 2,100 | 24 | | | |

TABLE 6.—SODIUM FLUORIDE (NaF)

[Summary of runs made with NaF as flux]

| Conc. | Temp., °F | Time, hr. | Surface Area | Percent Squalene | Col. T, °C. | MeOH Peak Height | Percent Separation |
|---|---|---|---|---|---|---|---|
| 2.0 | 1,800 | 1.0 | 2.01 | 20 | 100 | 23 | 87 |
| 2.0 | 1,900 | 1.0 | 1.87 | 20 | 100 | 22 | 95 |
| 2.0 | 2,000 | 1.0 | 1.11 | 20 | 100 | 42 | 98 |
| 2.0 | 2,100 | 1.0 | 0.83 | 20 | 100 | 37 | 95 |
| 3.0 | 1,800 | 1.0 | 1.47 | 20 | 100 | 25 | 92 |
| 3.0 | 1,900 | 1.0 | 0.99 | 20 | 100 | 49 | 96 |
| 3.0 | 2,000 | 1.0 | 0.80 | 20 | 100 | 40 | 94 |
| 3.0 | 2,100 | 1.0 | 0.71 | 20 | 100 | 45 | 97 |
| 4.0 | 1,800 | 1.0 | 0.98 | 20 | 100 | 44 | 95 |
| 4.0 | 1,900 | 1.0 | 0.64 | 20 | 100 | 45 | 95 |
| 4.0 | 2,000 | 1.0 | 0.45 | 20 | 100 | 32 | 94 |
| 4.0 | 2,100 | 1.0 | 0.21 | 20 | 100 | 25 | 82 |
| 4.0 | 1,900 | 1.0 | 0.73 | | | | |
| | | 1.0 | | 15 | 100 | 55 | 96 |
| | | 1.0 | | 10 | 100 | 44 | 86 |
| | | 1.0 | | 5 | 100 | 40 | 68 |
| 4.0 | 2,000 | 1.0 | 0.42 | | | | |
| | | 1.0 | | 15 | 100 | 52 | 94 |
| | | 1.0 | | 10 | 100 | 76 | 94 |
| | | 1.0 | | 5 | 100 | 67 | 77 |
| | | 1.0 | 0.21 | | | | |
| | | 1.0 | | 15 | 100 | 44 | 91 |
| | | 1.0 | | 10 | 100 | 75 | 93 |
| | | 1.0 | | 5 | 100 | 63 | 83 |
| | | 1.0 | | 2.5 | 100 | 97 | 64 |

It is believed that the above provides a complete description of the invention in such a manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A method of preparing a new gas chromatographic support comprising providing small particles of calcined diatomaceous silica and subjecting said particles to a further calcination employing a flux, for a period of time between about 6 and 96 hours at a temperature between about 1800° and 2400° F.

2. A method as defined in claim 1 wherein said flux is present in an amount between about 1 and 9% by weight of said diatomaceous silica.

3. A method as defined in claim 1 wherein said flux is selected from the group consisting of alkali metal hydroxide, alkali metal carbonates, alkali metal oxides, and alkali metal halogenates.

4. A method as defined in claim 3 wherein the flux is potassium carbonate.

5. A method as defined in claim 3 wherein the flux is potassium hydroxide.

6. A method as defined in claim 3 wherein the flux is sodium hydroxide.

7. A method as defined in claim 3 wherein the flux is sodium carbonate.

8. A method as defined in claim 3 wherein the flux is sodium fluoride.

9. A method for analyzing gaseous mixtures which comprise contacting a gaseous mixture in a stream of an inert gas with a column containing a support with a liquid phase on said support, comprising as the support, flux calcined crushed diatomaceous silica firebrick, whereby said mixture is separated into its components, and determining the amount of each component in the mixture.

10. In a method of gas chromatographic separation, the improvement which comprises utilizing as a column support a crushed diatomaceous silica firebrick material which has been subjected to double calcination, the second calcination of which was effected in the presence of a flux.

11. A support material for gas chromatography consisting essentially of hard, dense, crushed aggregates of double calcined diatomaceous silica wherein the first calcination is without flux and the second calcination is effected by means of a flux, said support material being characterized by low friability, high column efficiency, low degree of adsorption, and a substantially lower surface area than that of the material prior to flux calcination.

References Cited

UNITED STATES PATENTS

| Re. 20,844 | 9/1938 | Calvert et al. | 252—449 |
| 1,970,280 | 8/1934 | Cummins | 252—449 |
| 2,826,908 | 3/1958 | Skarstrom | 55—67 |
| 3,013,981 | 12/1961 | Riede | 252—449 |

FOREIGN PATENTS 521,214  5/1940  Great Britain.

OTHER REFERENCES

Howard, G. E. An Introduction to the Principles and Technique of Gas Chromatography. In Chemistry and Industry. Apr. 20, 1963, pp. 622–628.

Ottenstein, D. M. The Packed Chromatographic Column. In Progress In Industrial Gas Chromatography, ed. by H. A. Szymanski, N.Y. Plenum Press, 1961, pp. 51, 52 and 60–70.

SAMIH N. ZAHARNA, *Primary Examiner.*

REUBEN FRIEDMAN, *Examiner.*

C. N. HART, *Assistant Examiner.*

UNITED STATES PATENT OFFICE
CERTIFICATE OF CORRECTION

Patent No. 3,392,507                                                             July 16, 1968

Daniel Marvin Ottenstein

It is hereby certified that error appears in the above numbered patent requiring correction and that the said Letters Patent should read as corrected below.

Column 7, line 28, for "halogenates" read -- halides --.

Signed and sealed this 8th day of April 1969.

(SEAL)
Attest:

Edward M. Fletcher, Jr.                                    EDWARD J. BRENNER
Attesting Officer                                                   Commissioner of Patents